United States Patent [19]

Thomas

[11] Patent Number: 5,048,679

[45] Date of Patent: Sep. 17, 1991

[54] AIRCRAFT BRAKE DISK STACK GLOVE

[76] Inventor: William A. Thomas, 7405 Woodley Ave., Van Nuys, Calif. 91406

[21] Appl. No.: 533,882

[22] Filed: Jun. 6, 1990

[51] Int. Cl.⁵ .......................................... B65D 85/02
[52] U.S. Cl. ................... 206/303; 206/449; 206/451; 206/585; 220/672; 220/673
[58] Field of Search ............... 206/303, 318, 449, 451, 206/445, 521, 585, 444; 220/671, 672, 673

[56] References Cited

U.S. PATENT DOCUMENTS

| | | | |
|---|---|---|---|
| 1,643,252 | 9/1927 | McCrery | 220/620 |
| 3,168,774 | 2/1965 | Volkening | 206/318 |
| 3,335,902 | 8/1967 | Javorik | 220/673 |
| 3,913,735 | 10/1975 | Durbin | 206/303 |
| 3,955,673 | 5/1976 | Fosness | 206/318 |
| 4,233,586 | 11/1980 | Kaplow et al. | 206/444 |
| 4,257,527 | 3/1981 | Snyder et al. | 220/673 |
| 4,339,037 | 7/1982 | Doering | 206/444 |
| 4,475,652 | 10/1984 | Heard | 206/303 |
| 4,538,439 | 9/1985 | Frei | 220/673 |
| 4,790,430 | 12/1988 | Thomas | 206/303 |
| 4,893,713 | 1/1990 | Thomas | 206/304 |

Primary Examiner—David T. Fidei
Attorney, Agent, or Firm—Poms, Smith, Lande & Rose

[57] ABSTRACT

A device for protecting a carbon disk stack used in an aircraft brake assembly is disclosed. The glove-like device is constructed of an impact-resistant, flexible material and is installed by sliding the device over the carbon disk assembly. The device may be used to ship a carbon disk stack fixed to a torque tube of the brake assembly or to ship a stack of carbon disks alone.

18 Claims, 1 Drawing Sheet

U.S. Patent  Sep. 17, 1991  5,048,679
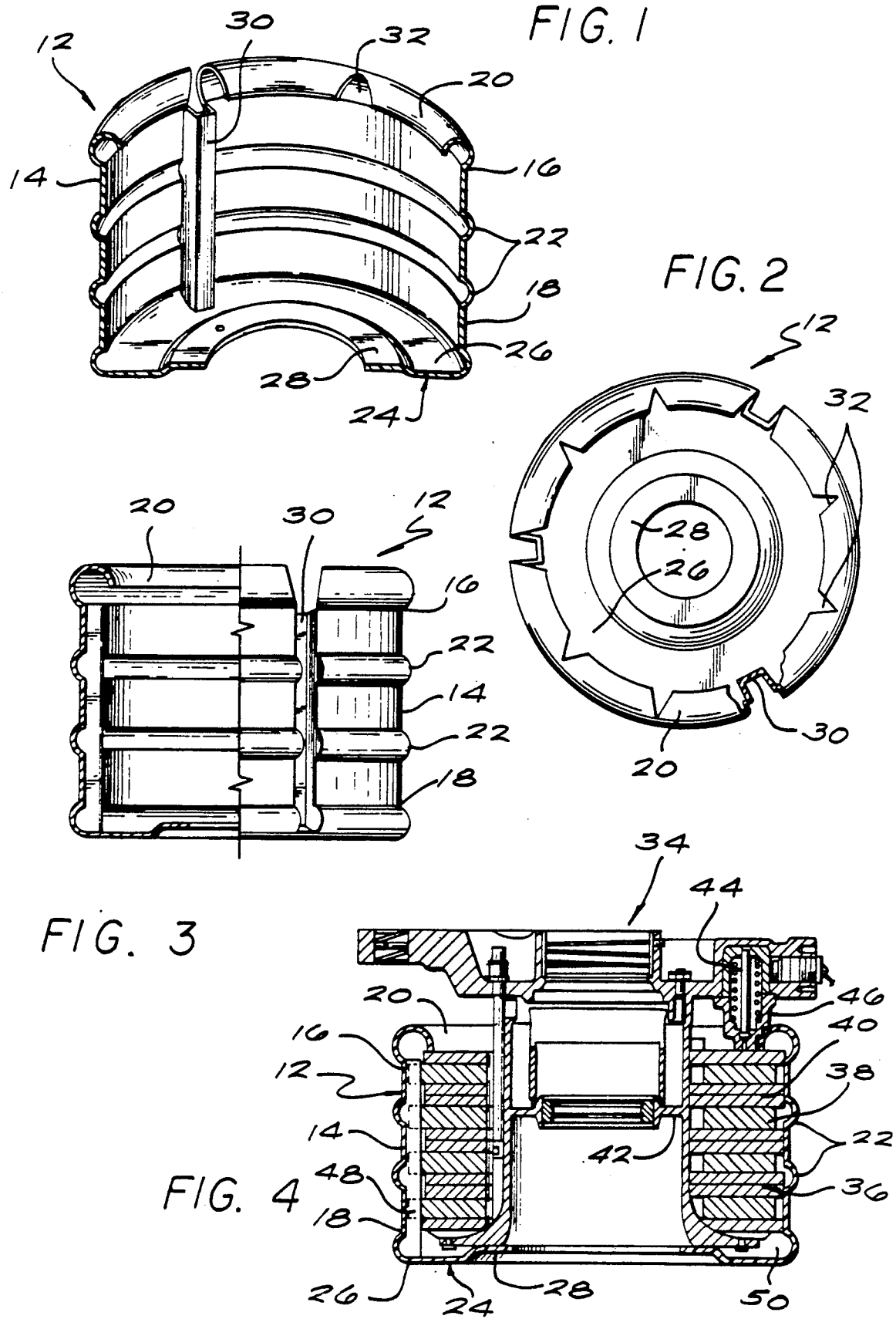

AIRCRAFT BRAKE DISK STACK GLOVE

FIELD OF THE INVENTION

This invention relates to a device for protecting aircraft brake carbon disk stacks and more particularly to a glove-like device constructed of a flexible, impact-resistant material which slides over a carbon disk stack used in aircraft brake assemblies and protects the carbon disks during shipping, storage and installation of the aircraft brake sub-assembly.

BACKGROUND OF THE INVENTION

Aircraft brakes require many unique design features in order to function under the patterns of use which they must undergo. The use patterns of aircraft brakes pose extraordinary design problems in that the brakes are required to withstand extreme loads for very short periods of time. Furthermore, these brief intense load periods are separated by extended periods of time in which the brakes are not used at all. This unusual duty cycle for aircraft brakes therefore requires unique design features.

It is common practice to utilize a carbon disk stack in an aircraft brake assembly. The carbon disk stack is formed of alternating stator and rotor disks. The stator disks are fixed or keyed to a torque tube in the aircraft brake assembly. The rotors, however, are keyed to rotate with the aircraft wheel. When the aircraft brakes are applied, pistons located in a piston housing in the brake assembly compress the carbon disk stack so as to stop the rotation of the rotor elements, which in turn, stop the rotation of the aircraft wheels.

Aircraft brake designers have discovered that the most effective material from which to construct the stator and rotor disks is a carbon material. The stator and rotor disks used in the brake assembly require a high temperature resistant material which is capable of withstanding temperatures over 1,000° Fahrenheit. Carbon, a high temperature resistant material, has proved to be most effective for use in the disks of the brake assemblies, and is widely used despite its high cost.

The use of carbon material in the disks, however, has created other problems in that carbon is a somewhat brittle material, which may be damaged by impact or shock. Therefore, when the brake assemblies are manufactured, shipped, installed, repaired or serviced, great care must be taken to avoid any damaging impact to the carbon disks. The additional labor and time required to prevent impact to the disks results in increased labor costs for manufacturing and shipping and added downtime in the installation and servicing of the brakes. This problem is exacerbated by the fact that the carbon disks are very expensive to replace. For example, each stack of carbon disks may cost up to $20,000 to $30,000. In the past, airlines have used wooden crates to protect the aircraft brake assemblies during shipping.

A lightweight aircraft brake assembly container is disclosed in W. A. Thomas, U.S. Pat. No. 4,790,430. This container is especially adopted for shipping certain portions of the brake assembly, primarily, the carbon disk portion. The container completely encloses the carbon disk stack with a body tube member, a base member, and a top closure member. Following initial assembly of the carbon disk stack and in the course of packaging the assembly for shipment, removal from the container before installation into the brake assembly on the aircraft, and during storage and installation after shipping, there is a significant danger that the carbon brake stack will be damaged by shock or impact.

Therefore, a need exists for a lightweight, impact-resistant device which will protect the carbon disks from damage during shipping of a carbon disk stack from the place of manufacture to the place of installation. A need also exists for a lightweight, impact-resistant device which will protect the carbon disks during shipping when the disk stack is fixed to a torque tube in the brake assembly.

Accordingly, the principal object of the present invention is to protect aircraft brake carbon disk stacks during shipping.

Another object of the present invention is to provide a device for protecting aircraft brake carbon disk stacks during shipping when the disk stack is fixed to a torque tube in the brake assembly.

A still further object of the present invention is to provide a device for protecting aircraft brake carbon disk stacks which is flexible and therefore easily installed by sliding the device over the carbon disk stack.

Another object of the present invention is to provide a device for protecting carbon disk stacks which is lightweight and impact-resistant.

SUMMARY OF INVENTION

In accordance with a specific embodiment illustrating the principles of the present invention, a device for protecting a carbon disk stack of an aircraft brake assembly is comprised of an open ended cylindrical tube having a inwardly extending rim on one end of the tube and an annular base member on the opposite end of the tube. The rim further has a series of notches or slits extending from the innermost edge of the rim toward the outer perimeter of the rim. The tube has a series of vertical grooves forming ribs indented toward the center of the tube and running down the length of the cylindrical tube. The ribs are disposed so as to prevent rotation of the rotor disks of the carbon disk stack. The cylindrical tube also has a series of outwardly extending ridges extending around the circumference of the tube between the vertical grooves. The ridges provide additional flexibility and strength to the device. The device is further constructed of a flexible impact-resistant material and is designed to slide over the carbon disk stack in a glove-like manner.

It is further noted that the annular base member may be raised from its periphery to a central flat area to provide further resilient shock protection; and the glove-like assembly may be formed of flexible polyethylene about ⅛ inch thick, or other similar flexible materials. Many of the advantages of the glove-like structure may be realized with a structure that does not include all of the structural features as identified hereinabove.

Other objects, features and advantages of the invention will become apparent from a consideration of the following detailed description and from the accompanying drawings.

BRIEF DESCRIPTION OF THE DRAWINGS

FIG. 1 is a cross-sectional perspective view of an aircraft brake carbon disk stack glove, illustrating the principles of the invention;

FIG. 2 is a top view of the aircraft brake carbon disk stack glove;

FIG. 3 is a front fragmentary view of the aircraft brake carbon disk stack glove; and FIG. 4 is a cross-sectional view of a carbon disk stack fixed to an aircraft brake assembly torque tube and disposed within the aircraft brake carbon disk stack glove.

DETAILED DESCRIPTION OF THE INVENTION

Referring now to FIGS. 1 to 4, an aircraft brake carbon disk stack glove 12 for protecting a carbon disk stack 36 used in an aircraft brake assembly 34 is shown. The glove 12 is comprised of a cylindrical tube 14, an upper rim 20 and a base member 24. For purposes of reference only, the cylindrical tube 14 is said to have a first end 16 and a second end 18. At the first end 16 of the cylindrical tube 14, the rim 20 is formed. In the embodiment shown, the rim 20 is rounded and extends inward from the perimeter of the tube 14 and curves downward toward the inside of the tube 14. The rim 20 confines the stack of carbon disks 36 and provides shock protection for the brake assembly 34.

As best shown in FIG. 1, the second end 18 of the cylindrical tube 14 is attached to the base member 24. In the embodiment shown, the base member 24 is annular shaped and extends inwardly from the perimeter of the second end 28 of the tube 14. In the embodiment shown, the base member 24 is further comprised of an outer annular ring 26 and an inner annular ring 28. The outer perimeter of the inner annular ring 28 is attached to the outer annular ring 26 at the inner perimeter of the outer annular ring 26. The outer annular ring 26 and the inner annular ring 28 are in parallel planes, however, the inner annular ring 28 is in a plane slightly raised into the tube 14. The brake assembly 34 therefore only contacts the inner annular ring 28. Because the brake assembly 34 does not contact the outer annular ring 26, a void 50 is defined between the brake assembly 34 and the outer annular ring 26. The void 50 provides increased impact resistance for the lower end of the carbon disk stack 36, as the flexible plastic web interconnecting rings 26 and 28 would flex if the unit of FIG. 4 were set down heavily, or dropped a short distance.

The cylindrical tube 14 further includes a plurality of vertical grooves or inwardly directed ribs 30. As best shown in FIG. 1, the vertical ribs 30 extend inward toward the center of the cylindrical tube 14. The vertical grooves 30 run down the length of the cylindrical tube 14 from the first end 16 to the second end 18 of the tube 14. In one embodiment of the present invention, three vertical grooves 30 are utilized. As best shown in FIG. 2, the vertical grooves 30 are equally spaced apart around the circumference of the cylindrical tube 14.

The vertical grooves 30 are disposed around the circumference of the cylindrical tube 14 so as to align with keyways 48 formed by recesses in the outer periphery of the rotor disks 40 in the carbon disk stack 36. The grooves 30 extend into the keyways 48 of the rotor disks 36, securing the glove 12 in place. Therefore, the glove 12 will not rotate around the carbon disk stack 36, and the rotor disks 40 will not rotate during shipping. Consequently, the number of grooves 30 and the location of the grooves 30 is determined by the number and location of the keyways 48 formed in the rotor disks 40 of the disk stack 36 with which the glove 12 is to be used. Subsequently, when the brake assembly is mounted on the aircraft, the rotor keyway interfits with mating ribs fixed to the wheel assembly.

The cylindrical tube 14 also comprises a plurality of horizontal ridges 22. The ridges 22 extend around the circumference of the cylindrical tube 14 between the grooves 30. In one embodiment of the invention, four ridges are used, spaced from each other between the first end 16 and the second end 18 of the cylindrical tube 14. The ridges 22 provide increased strength to the cylindrical tube 14, and greater flexibility and impact resistance. The increased flexibility and impact resistance provides greater protection for the carbon disk stack 36.

As an additional feature to the brake carbon disk stack glove 12, the rim 20 may further include a plurality of notches or slits 32 formed within the rim 20. The notches 32 extend from the innermost edge of the rim 20 toward the outermost edge of the rim 20. In one embodiment of the present invention, six notches 32 are formed within the rim 20. As best shown in FIG. 2, the notches 32 are equally spaced apart between the vertical grooves 30. The notches 32 provide greater flexibility to the rim 20 so that the brake disk assembly glove 12 is easily slidable over carbon disk stack 36. The number and spacing of the notches 32, however, will vary according to the size of the carbon disk stack 36 with which the glove 12 is to be used.

The material from which the carbon disk stack glove 12 is constructed is preferably lightweight, flexible, and impact-resistant, but which has sufficient strength to resiliently maintain its shape, as shown in FIG. 1. A lightweight material is desired to keep shipping costs at a minimum. A flexible material is desired to facilitate installation of the carbon disk stack glove 12 over the carbon disk stack 36. The flexible material also provides increased impact-resistance. An impact-resistant material is desired to provide maximum protection to the carbon disk stack 36.

In order to provide the desired levels of both rigidity and flexibility, the material from which the glove 12 is constructed may consist of a cross-linked polyethylene material. The polymer chains of the cross-linked polyethylene material are minimally cross-linked to allow greater flexibility in the polyethylene material. The cross-linked polyethylene material is therefore lightweight, flexible and impact-resistant. Furthermore, the polyethylene material is not affected by the hydraulic fluid used in the aircraft brake assembly. Other materials may alternatively be used. These other materials include, but are not limited to, plastic, fiberglass and composite materials.

The carbon disk stack glove 12 is preferably constructed with walls which are about 0.1 to 0.125 inch in thickness, with somewhat greater or lesser thickness such as 0.050 inch to 0.250 inch being preferred. This range of dimensions for the thickness of the glove 12 provides sufficient impact resistance without adding unnecessary weight and volume to the brake assembly for shipping purposes.

The carbon disk stack glove 12 is primarily for use with commercial and military aircraft. Because the carbon disks for these two types of aircraft are of different sizes, the glove 12 is also available in different sizes. For example, in one embodiment, the cylindrical tube 14 of the carbon disk glove 12 is approximately twenty-two inches in inner diameter, and approximately ten inches in length. This embodiment is typically used for commercial aircraft. In another embodiment of the invention, the cylindrical tube 14 is approximately eight to ten inches in inner diameter, and three to four inches in height. This embodiment is typically used for military aircraft.

For completeness, the dimensions of the embodiment shown in FIGS. 1 to 3 are disclosed. The cylindrical tube 14 of FIGS. 1 to 3 is approximately eight and one-half inches in length between the first end 16 and the second end 18. The tube 14 has an inner diameter of approximately seventeen inches. The inner diameter of the annular base member 24 is approximately seven and one-half inches. In general, it is contemplated that the height of the container will be between about 3 inches and a foot, and that the inner diameter of the tube walls will be between about eight inches and two feet. However, it is to be understood that these dimensions are merely representative, and that somewhat greater or lesser dimensions could be used for special applications.

Referring now to FIG. 4, the carbon disk stack glove 12 is shown as installed on the brake assembly 34. As shown in FIG. 4, the carbon disk stack 36 and torque tube 42 fit within and are protected by the carbon disk stack glove 12. The carbon disk stack 36 is comprised of stator disks 38 and rotor disks 40. The stator disks 38 and rotor disks 40 may be arranged in an alternating pattern, or in any other pattern necessary for the design of the brakes. As shown in FIG. 4, the stator disks 38 are keyed to the torque tube 42. Therefore, the stator disks 38 are in a fixed position and do not rotate. In comparison, the rotor disks 40 rotate with the aircraft wheels as discussed above.

Also shown in FIG. 4 are a plurality of pistons 44. The pistons 44 are disposed within a piston housing 46 located above the top surface of carbon disk stack 36. When the brakes of the aircraft are applied, the hydraulic pistons 44 compress the carbon disk stack 36 downward, thereby compressing the carbon disks together. The compression stops the rotation of the rotor disks 40 and, as a result, stops the rotation of the aircraft wheels.

As seen in FIG. 4, the aircraft brake disk stack glove 12 is designed to slide over and to surround the carbon disk stack 36. When the glove 12 is in place, the vertical grooves 30 of the glove 12 extend into the keyways 48 formed in the rotor disks 40. Therefore, the inwardly extending ribs 30 of the glove 12 hold the glove 12 in place and prevent the glove from rotating around the carbon disk stack 36, as well as preventing the rotor disks 40 from rotating during shipping, maintaining rotor disk alignment for assembly to wheel structures. As also shown in FIG. 4, the glove 12 is designed so that the torque tube 42 rests against the inner annular ring 28 of the annular base member 24. The carbon disk stack 36 and torque tube 42, however, do not contact the outer annular ring 26 of the base member 24. As previously described herein, the void 50 defined between the carbon disk stack 36 and the outer annular ring member 26 provides further shock absorbency and impact-resistance for the carbon disk stack 36.

The design of the brake disk assembly glove 12 allows the glove 12 to be slid over the carbon disk stack 36 while the stator disks 38 are fixed to the torque tube 42. Therefore, the glove 12 may be used to ship a carbon disk stack 36 assembled to the torque tube 42. Alternatively, the glove 12 may also be installed over only a stack of carbon disks 36 which are not attached to the torque tube.

Having best described exemplary embodiments of the present invention, it should be noted by those skilled in the art that the within disclosures are exemplary only and that various other alternatives, adaptations and modifications may be made within the scope of the invention. Thus, by way of example, but not of limitation, the size of the cylindrical tube 14 may vary according to the carbon disks with which the glove 12 is to be used. Alternatively, the number and spacing of the ridges 22, the vertical grooves or ribs 30 and the notches 32 may vary according to the brake disk assembly with which the glove is to be used. Accordingly, it is to be understood that the present invention is not limited to the precise construction as shown in the drawings and described herein above.

I claim:

1. An impact-resistant container for shipping aircraft brake assemblies, the brake assemblies comprising a stack of carbon disks, said stack of disks having a plurality of axially extending keyways on the outer periphery of spaced disks in said stack, the container comprising:

an open-ended cylindrical tube having a first and a second end, said tube being of molded, semi-flexible material;

a flexible rim extending inwardly from the first end of the cylindrical tube;

an annular base member extending inwardly from the perimeter of the second end of the tube;

a plurality of lateral shock absorbing ridges extending outward substantially around the circumference of the tube;

said rim being interrupted at a plurality of points around its periphery whereby the stack of disks may be mounted within said container by flexing said rim; and a plurality of vertical grooves, the grooves extending inwardly from the circumference of the tube to form ribs for interlocking with said keyways;

whereby the ribs interlock with the keyways of the carbon disk stack when the disk stack is inserted into the container and said stack of carbon brake disks may be protected from shock or damage when unassembled from the aircraft.

2. A container in accordance with claim 1 wherein the container is constructed out of a cross-linked polyethylene material.

3. A container in accordance with claim 2 wherein the polymer chains of the polyethylene material are minimally cross-linked so as to allow flexibility in the polyethylene material.

4. A container in accordance with claim 1 wherein the length of the cylindrical tube from the first end to the second end is between about three and twelve inches and the inner diameter of the tube is between about eight and twenty-four inches.

5. A container in accordance with claim 1 wherein said base member includes a peripheral area for supporting said container and a raised inner area for resiliently supporting said disks.

6. An impact-resistant container for shipping a stack of alternating rotor and stator carbon disks used in an aircraft brake assembly, said rotor disks having a plurality of axially extending keyways formed on their peripheries, comprising:

an open-ended flexible cylindrical tube having a first and a second end, wherein the length between the first and the second end is between three and twelve inches, the inner diameter of the tube is between eight and twenty-four inches, and the wall thickness of the tube is between 0.050 and 0.250 inch, so that the tube closely surrounds the carbon disk stack;

a flexible rim extending inward from the first end of the cylindrical tube;

an annular base member extending inwardly from the perimeter of the second end of the tube, wherein the inner diameter of the annular base member is approximately seven and one-half inches;

a plurality of vertical grooves, the grooves extending inwardly from the circumference of the tube to form ribs for interlocking with the keyways of the rotor disks when the disks are inserted into the container;

a plurality of lateral shock-absorbing ridges extending outward and surrounding the portion of the circumference of the tube between the vertical grooves; and said rim having a plurality of interruptions around its periphery to facilitate the mounting of the carbon disks within the cylindrical tube.

7. An impact-resistant device for a stack of carbon disks used in aircraft brake assembly comprising:

an open-ended flexible non-metallic cylindrical tube having a first and a second end, said tube having outwardly extending shock absorbing means for reducing impact shock to said carbon disks and protecting the stack of carbon disks from damage;

a flexible rim extending inward from the perimeter of the first end of the cylindrical tube;

a plurality of lateral ridges extending outward from and substantially surrounding the circumference of the cylindrical tube;

a plurality of inwardly extending vertical grooves, the grooves running from the first end down to the second end of the cylindrical tube;

the length of the cylindrical tube from the first end to the second end is between about three and twelve inches and the inner diameter of the tube is between about eight and twenty-four inches; and an annular base member attached to the second end of the tube.

8. A device in accordance with claim 7 wherein the ridges are substantially equally spaced apart from the first end to the second end of the cylindrical tube.

9. A device in accordance with claim 7 wherein the rim further comprises a plurality of notches or slits, the notches extending outward from the innermost edge of the rim toward the outermost edge of the rim.

10. A device in accordance with claim 9 wherein the notches or slits are substantially equally spaced apart around the circumference of the rim.

11. A device in accordance with claim 7 wherein the grooves are substantially equally spaced apart around the circumference of the cylindrical tube.

12. A device in accordance with claim 7 wherein the device is constructed out of a cross-linked polyethylene material.

13. A device in accordance with claim 12 wherein the polymer chains of the cross-linked polyethylene material which are minimally cross-linked to allow flexibility in the polyethylene material.

14. A device in accordance with claim 7 wherein the cylindrical tube is between approximately 0.050 to 0.250 inch in wall thickness.

15. A device in accordance with claim 7 wherein the base member includes a peripheral area for supporting said container and a raised inner area for resiliently supporting said disks.

16. A device in accordance with claim 1 wherein the annular base member is further comprised of an outer annular member and a inner annular member wherein the outer perimeter of the inner annular member is attached to the inner perimeter of the outer annular member and the inner annular member is in a plane parallel to the first annular member, the plane of the inner annular member being slightly raised into the center of the cylindrical tube.

17. A device in accordance with claim 7 wherein the configuration of said rim involves an initial outwardly extending portion, and an upwardly extending portion, prior to extending inward and downward to resiliently confine the stack of carbon disks, and to provide additional shock protection for the assembly.

18. An impact-resistant device for protecting a stack of carbon disks used in an aircraft assembly comprising:

an open-ended flexible, non-metallic cylindrical tube having a first and a second end;

a flexible rim extending inward from the perimeter of the first end of the cylindrical tube;

an annular-base member attached to the second end of the tube;

a stack of carbon disks used in an aircraft brake assembly disposed within the cylindrical tube; and said tube having outwardly extending shock absorbing means for reducing impact shock to said carbon disks and protecting the stack of carbon disks from damage.

* * * * *